April 19, 1966   J. MERCIER   3,246,664
UNLOADER VALVE SYSTEMS
Filed May 1, 1961   3 Sheets-Sheet 1

INVENTOR
JEAN MERCIER

BY Dean, Fairbank & Hirsch
ATTORNEY

April 19, 1966  J. MERCIER  3,246,664
UNLOADER VALVE SYSTEMS
Filed May 1, 1961  3 Sheets-Sheet 2
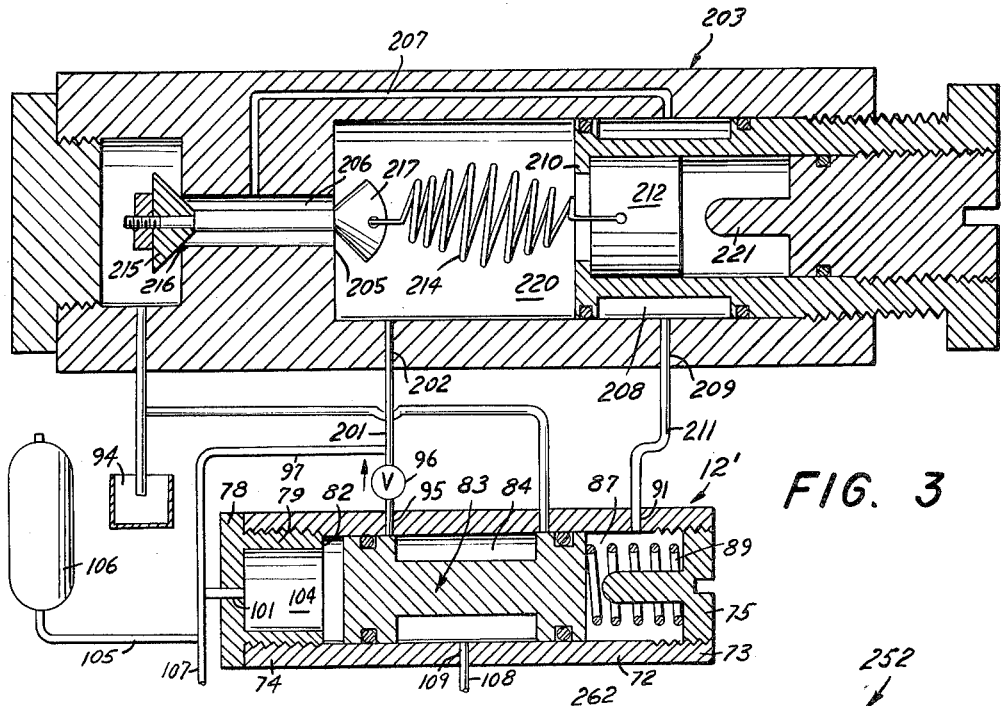
FIG. 3
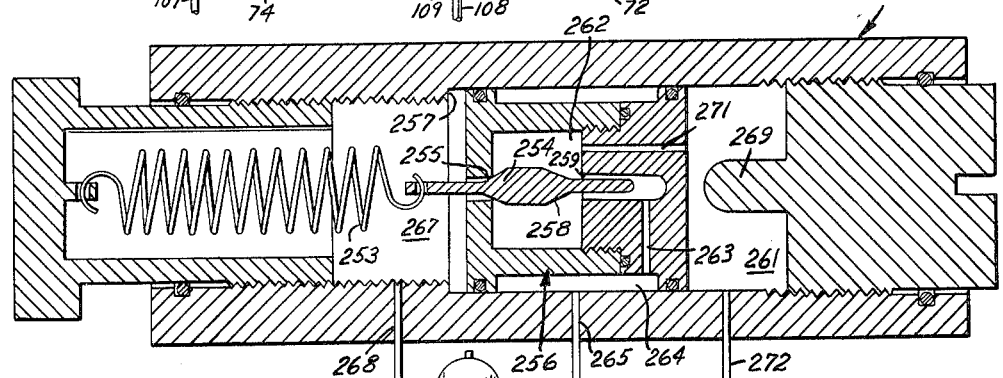
FIG. 4
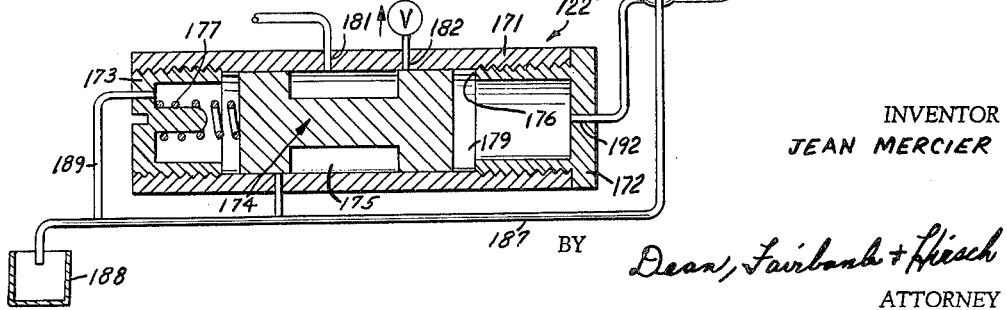
INVENTOR
JEAN MERCIER
BY Dean, Fairbank & Hirsch
ATTORNEY April 19, 1966  J. MERCIER  3,246,664
UNLOADER VALVE SYSTEMS
Filed May 1, 1961  3 Sheets-Sheet 3

INVENTOR
JEAN MERCIER

BY Dean, Fairbank + Hirsch
ATTORNEY

United States Patent Office 3,246,664
Patented Apr. 19, 1966

3,246,664
UNLOADER VALVE SYSTEMS
Jean Mercier, 1185 Park Ave., New York, N.Y.
Filed May 1, 1961, Ser. No. 118,215
4 Claims. (Cl. 137—108)

This invention relates to the art of valve systems, more particularly to those employing a pilot valve that controls a main unloader valve.

It is among the objects of the invention to provide a valve system of the above type that is relatively simple in construction and dependable in operation and which will retain the fluid pressure in a hydraulic system within predetermined limits which may readily be set.

According to the invention these objects are accomplished by the arrangement and combination of elements hereinafter described and more particularly recited in the claims.

Figure 1:
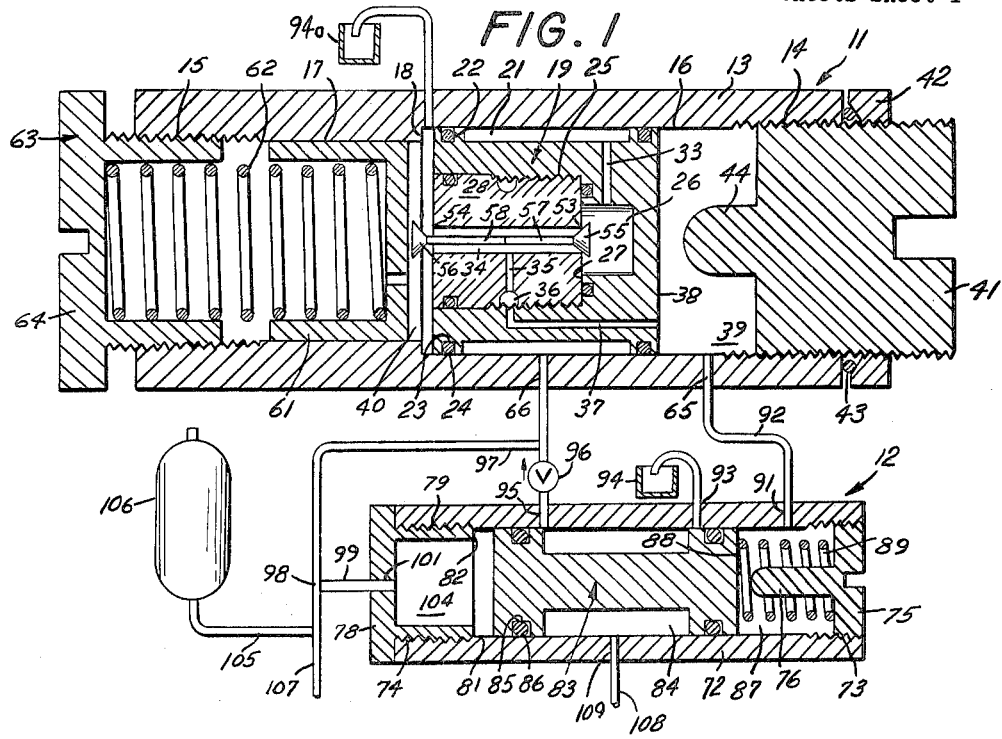
Figure 2:
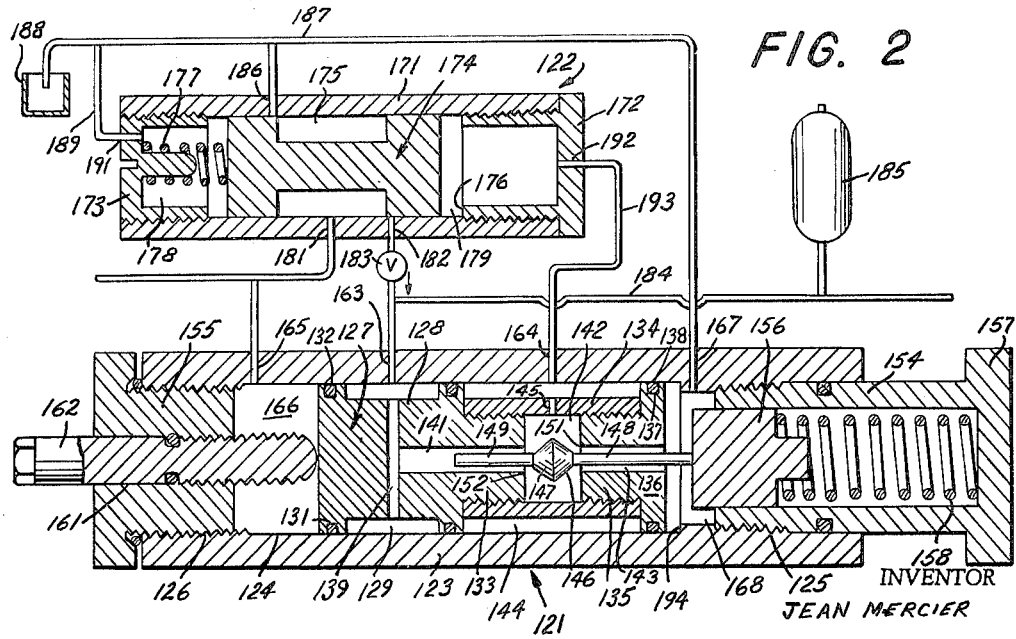
Figure 5:
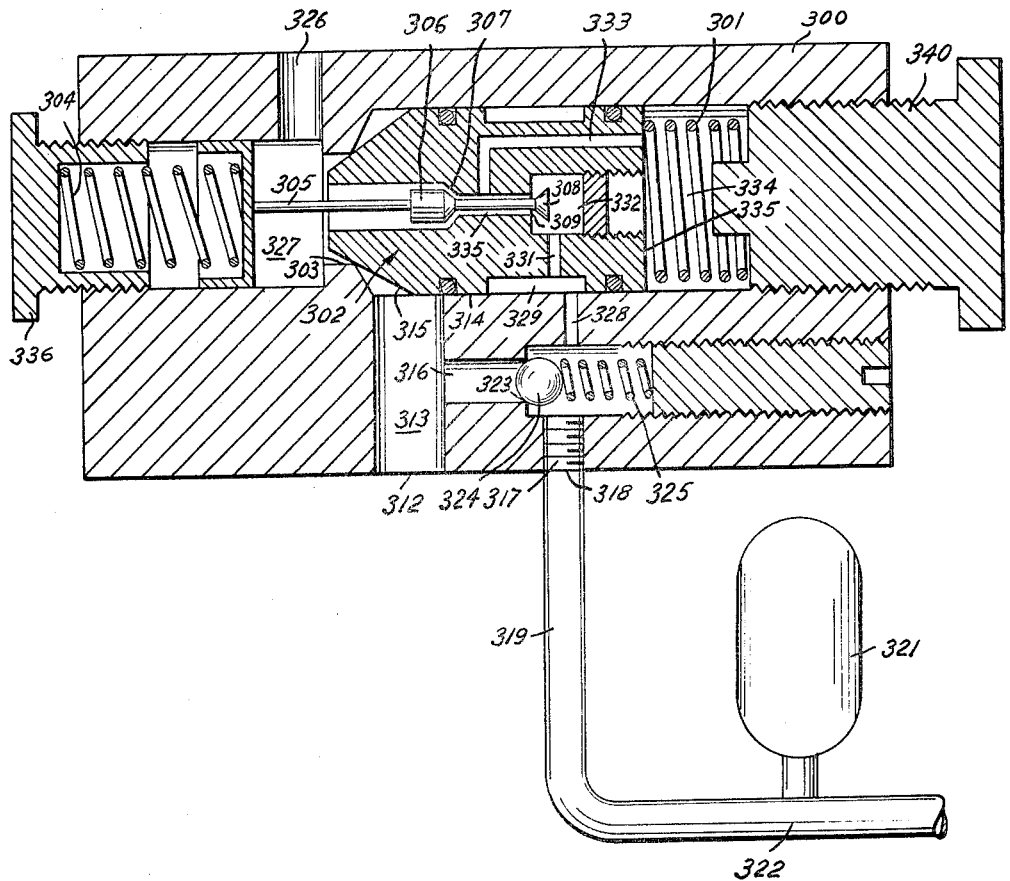

In the accompanying drawings in which are shown one or more of the various embodiments of the several features of the invention, FIG. 1 is a longitudinal sectional view of a valve system employing a separate pilot and unloader valve in which the pilot valve uses a compression spring, FIG. 2 is a view similar to FIG. 1 of another embodiment of the invention, FIGS. 3 and 4 are views similar to FIG. 1 of other embodiments using traction springs, and FIG. 5 is still another embodiment in which both the pilot and unloader valves are incorporated in one housing.

Referring now to the drawings, in the embodiment shown in FIG. 1 the valve system comprises a pilot valve 11 and an unloader valve 12. The pilot valve 11 comprises a cylindrical housing 13 internally threaded at each end thereof as at 14 and 15. The bore 16 of the valve 11 is of reduced diameter as at 17 adjacent the end 15 thereof defining an annular shoulder 18.

Slidably mounted in the enlarged diameter portion of the bore 16 is a piston 19 having an elongated annular recess 21 in its outer periphery defining annular shoulders 22 at each end of the piston. Each of the annular shoulders has an annular groove 23 in which is positioned an annular sealing ring 24 to provide a seal between the piston and the bore surface of the housing 13. The piston 19 has an internally threaded cylindrical axial recess 25 therein of reduced diameter as at 26 at the end thereof adjacent end 14 of the housing 13 and defining an annular shoulder 27, said reduced diameter portion 26 forming a chamber. Positioned in the cylindrical recess 25 is a cylindrical plug 28 which abuts against the annular shoulder 27, the latter having an annular groove in which an "O" ring is positioned to provide an effective seal.

The piston 19 has a transverse passageway 33 providing communication between annular groove 21 and the chamber 26. The plug 28 has an axial bore 34 therethrough which leads into said chamber 26. The plug 28 has a transverse passageway 35 which leads from the axial bore 34 to an annular groove 36 in the periphery of said plug. The piston has a passageway 37 leading from said annular groove 36 through the end 38 of the piston into a chamber 39 defined between such end 38 of the piston and a plug 41 screwed into the internally threaded end 14 of the housing. As shown, the plug is retained in set position by means of a lock ring 42 encompassing the plug, a sealing ring 43 being provided to afford a dependable seal. The plug 41 has an axial extension 44 in said chamber 39 against which the end 38 of the piston 19 will abut in operation of the device.

The ends 53, 54 of the bore of the plug 28 define valve seats against which may be seated valve heads 55, 56, respectively. The valve heads 55, 56 have stems 57, 58 respectively, positioned in the bore 34, the ends of said stems being adapted to abut. The length of the valve stems are such that when one of the valve heads is against its seat, the other valve head will be spaced from its seat as shown in FIG. 1.

Adapted to react against the valve head 56 is a cup-shaped follower member 61 slidably mounted in the reduced diameter portion 17 of the bore of the housing 13. Reacting against the follower 61 is a coil spring 62 compressed between the follower and the end of a hollow plug 63 screwed into the end 15 of the body portion 13, said plug 63 have a head 64 to permit ready rotation thereof. The space 40 between piston 19 and the follower 61 is connected to reservoir 94a.

The housing 13 has a port 65 leading into chamber 39 and an additional port 66 leading into the annular groove 21, said ports being connected in the manner now to be described.

Referring to FIG. 1, the unloader valve 12 comprises a cylindrical housing 72 internally threaded at each of its ends 73, 74. The end 73 is closed by a plug 75 screwed into said internally threaded end, said plug having an axial extension 76. The end 74 of the body portion 72 is closed by a hollow plug 78, the body portion 79 of which extends into the bore 81 of the body portion 72, the end 82 of said body portion 79 defining an abutment.

Slidably mounted in the bore 81 of the body portion 72 is a piston 83 which has an elongated annular groove 84 in its outer periphery. The ends of the piston 83 each has has an annular groove 85 in which is positioned an annular sealing member 86 to define a seal.

Encompassing the axial extension 76 of plug 75 and positioned in the chamber 87 defined between the plug 75 and the adjacent end 88 of piston 83, is a coil spring 89 which normally urges said piston to the left against the abutment 82. The housing 72 has a port 91 connected by line 92 to port 65 of the pilot valve 11, said port 91 leading into the chamber 87. In addition, the housing 72 has a port 93 which is connected to a reservoir 94, which port 93 is in communication with the annular groove 84 when the piston abuts against the axial extension 76 and which is closed when the piston abuts against the stop 82. A further port 95 is provided which is connected through one-way valve 96 to port 66 of the pilot valve 11 and also through said one-way valve 96 and line 97 to junction 98, said junction being connected by line 99 to an axial port 101 in the plug 78 which leads into a chamber 104 and by line 105 to a pressure accumulator 106 of conventional type, and by line 107 to the system to be operated. A source of fluid under pressure from, say, a pump, is applied to the unloader valve through line 108 connected to port 109 leading into the annular groove 84.

In the operation of the system shown in FIG. 1, when fluid under pressure is applied to the system through line 108 and port 109, it will pass through the annular groove 84 and through port 95, check valve 96, port 66 into the annular groove 21 in the piston 19. Thence, it will pass through passageway 33 into chamber 26 and since valve member 55 initially is off its seat when the system is turned on (i.e. spring 62 is extended and follower 61 reacts against valve head 56 to seat the latter and the end 38 of piston 19 abuts against member 44) the fluid will pass through bore 34, passageways 35 and 37 into chamber 39 and thence from chamber 39, through port 65, line 92, port 91 into the chamber 87 of the unloader valve 12.

Since such fluid under pressure will also be applied through lines 97 and 99, port 101 into chamber 104, the piston 83 of the valve 12 will be in balance, i.e., the pressure on both sides will be equal since fluid under pressure from port 109 will pass into both chambers 87 and 104. Consequently, in view of the spring 89, the piston 83 will be retained against the stop 82 so that fluid can continue to pass from the pump connected to port 109 into the valve 11 and into accumulator 106 through line 105 to load the accumulator and through line 107 to the system to be operated.

As the pressure builds up in chamber 39 of valve 11, the piston 19 will be forced to the left against the tension of coil spring 62 until it abuts against shoulder 18, the follower 61 retaining valve head 56 in closed position and the valve head 55 in open position, the tension of the spring 62 which has been compressed now exerting greater force against the valve head 56.

When the pressure in the accumlulator 106 increases due to the action of the pump, to the maximum predetermined limit, illustratively 3,000 p.s.i., then at such time the pressure in chamber 39 of the valve 11 will be 3,000 p.s.i. as it also will be in chamber 26 and in the bore 34 of piston 19. At that moment, i.e., at a pressure of 3,000 p.s.i., due to the physical configuration of the system there will be enough force reacting against the valve head 56 to unseat the latter against the tension exerted by the compressed spring 62. When this occurs the valve head 55 will thereupon seat to stop further flow of fluid under pressure into chamber 39.

As a result of the cessation of flow of fluid into chamber 39, the pressure in said chamber 39 will drop and the compressed coil spring 62 will extend and move piston 19 to the right until it abuts against member 44, the fluid in chamber 39 flowing through passageways 37 and 35 and bore 34 into chamber 40 between follower 61 and piston 19, said chamber 40 being permanently connected to reservoir 94a. In addition, the pressure in chamber 87 of valve 12 will drop. Consequently, due to the pressure still existing in chamber 104, i.e., 3,000 p.s.i., due to the pumping action, the piston 83 of the valve 12 will move quickly to the right thereby cutting off further flow of fluid through port 95 into the system. At this time the pump will be connected through port 93 to the reservoir 94.

Since no more fluid under pressure is being forced into the accumulator 106, due to the utilization of the accumulator by the system it is operating, the pressure therein will drop say, to 2,800 p.s.i.

At this time since the chamber 26 in valve 11 is also under a pressure of 2,800 p.s.i. from the accumulator 106, which pressure is reacting against the closed valve head 55, there is not sufficient force due to the pressure of 2,800 p.s.i. in chamber 26 to maintain the valve head 55 seated against the force exerted by the extended coil spring 62 against valve head 56 and consequently, due to the force against valve head 56 by the extended spring 62, the valve head 55 will again become unseated and in addition, valve head 56 will seat.

At this time, since valve head 55 is open there will again be flow of fluid into chamber 39 and hence into chamber 87 of the unloader valve 12 at such pressure of 2,800 p.s.i. Since the chamber 104 of the valve 12 also has 2,800 p.s.i., applied thereto, the spring 89 will immediately move the piston 83 to the left to again provide communication between the pump and the port 66 of valve 11 to repeat the operation. Thus, the system will maintain itself between limits of 2,800 and 3,000 p.s.i. in the embodiment shown.

It is of course to be understood that by regulating the compression of spring 62 and the position of the plug 41, the range of action can be predetermined. The spring 62 limits the maximum pressure when the piston 19 is to the left and the abutment 44 limits the minimum pressure because it determines the degree of extension of the coil spring 62 so that the point of minimum pressure at which the system will reverse is determined by such two settings.

In the embodiment shown in FIG. 2, the valve system comprises a pilot valve 121 and an unloader valve 122.

The valve 121 comprises a cylindrical housing 123, the ends of the bore 124 of which are threaded as at 125, 126. Slidably mounted in the bore 124 is a piston 127 which comprises a cylindrical member 128 having an elongated annular groove 129 and having annular grooves 131 at each end in each of which a resilient annular seal 132 is mounted. The member 128 has an axial extension 133 of reduced diameter which is threaded to accommodate one end of a sleeve 134, a plug 135 being secured in the other end of the sleeve, said plug having a cylindrical head 136 the periphery of which has an annular groove 137 in which an annular seal 138 is positioned.

The member 128 has a diametric bore 139 leading into groove 129 and in communication with an axial bore 141 extending through a portion of member 128 and through extension 133 and leading into a chamber 142 defined between said extension 133 and plug 135, the latter having an axial bore 143.

As shown, the chamber 142 is in communication with the annular chamber 144 defined between the end of member 128 and the head of plug 135, through bore 145 in sleeve 134.

Positioned in chamber 142 are valve heads 146, 147, each having a stem 148, 149 respectively extending into bores 143 and 141, said valve heads being adapted to seat on the ends 151, 152 of said bores. As shown, the stem 148 is of length such that when valve head 146 is seated and valve head 147 abuts thereagainst, the end of stem 148 will protrude from the bore 143.

To close the ends 125, 126 of the housing 123, plugs 154, 155 are screwed into such ends respectively.

The plug 154 is hollow and slidably mounts a piston 156 normally urged away from the head 157 of the plug by a coil spring 158.

The plug 155 has an axial bore 161 in which an abutment screw 162 is threaded to limit the movement of piston 127.

The housing 123 has a port 163 in communication with an annular groove 129; a port 164 in communication with annular groove 129; a port 164 in communication with chamber 166 between plug 155 and piston 127, and a port 167 in communication with chamber 168 between head 136 and plunger 156.

The unloader valve 122 has a cylindrical hollow housing 171 closed at each end by a hollow plug 172, 173 respectively.

Slidably mounted in the bore of housing 171 is a piston 174 which has an elongated annular groove 175. The piston is normally urged to the right against the end 176 of plug 172 by a coil spring 177 positioned in the chamber 178 defined between plug 173 and the adjacent end of the piston 174, an additional chamber 179 also being defined between the other end of the piston and plug 172.

The housing 171 has a port 181 in communication with annular groove 175 and connected to port 165 of the casing and to a source of fluid under pressure such as from a pump.

A further port 182 in the housing is open when the piston abuts against plug 172 and is closed when the piston abuts against plug 173. The port 182 is connected through one-way valve 183 to port 163 and by line 184 to pressure accumulator 185 as well as to the system to be operated.

In addition, the housing 171 has a port 186 which is open when the piston abuts against plug 173 and is closed when the piston abuts against plug 172. The port 186 is connected by line 187 to reservoir 188; by lines 187 and 189 to a port 191 in plug 173 leading into chamber 178 and by line 187 to port 167.

The plug 172 also has a port 192 leading into chamber 179 and connected by line 193 to port 164 of valve 121.

Initially when the system is started, the spring 177 of valve 122 will keep the piston 174 thereof against the end 176 of plug 172 at the right side of housing 171 so that fluid under pressure from the pump can pass through port 181, annular groove 175 and port 182, valve 183 into port 163 of valve 121 and also through line 184 to accumulator 185 to charge the latter and to the system to be operated. The fluid under pressure will also pass through port 165 into chamber 166 to react against piston 127 to move the latter to the right until it abuts against stop 194.

Initially the spring 158 of valve 121 is in extended condition reacting against stem 148 to retain valve head 147 against its seat 152, the movement of the piston 127 to the right compressing the spring 158 and retaining valve 147 seated with greater force.

As the pressure builds up and reaches say, 3,000 p.s.i., such pressure will react against valve head 147 to move it off its seat and the valve 146 will be seated. At this time the fluid under pressure from port 163 will flow into chamber 142 and through ports 145, 164, line 193 and port 192 into chamber 179 of valve 122.

As a result, the piston 174 of valve 122 will be moved to the left against the tension of coil spring 177. This will cause port 182 to be closed and will connect the port 181 to which the fluid under pressure is applied through port 186 to the reservoir.

As a result, the pressure in chamber 166 will quickly drop and the spring 158 will extend and move piston 127 to the left against abutment 162.

As the accumulator pressure drops, due to the use of the system, since the accumulator is connected by line 184 to chamber 142, when the pressure drops sufficiently so that the force of the extended spring 158 will overcome the force exerted against valve head 146, the latter will be moved off its seat and valve head 147 will again seat.

Opening of valve 146 will cause the pressure in chamber 179 of valve 122 to drop as the fluid in such chamber passes through line 193 into chamber 168 and thence through line 187 to the reservoir. As a result, the spring 177 will move piston 174 of valve 122 to the right to again connect the pressure port 181 to port 182 to repeat the operation.

In the embodiment shown in FIG. 3, an unloader valve 12', such as that shown in FIG. 1 is employed.

In this embodiment when the equipment is initially turned on, the spring 89 will retain the piston 83 of the unloader valve in position such that pressure port 109 and outlet pressure port 95 are in communication. In addition, the spring 214 of the pilot valve 203 will retain the valve head 215 against its seat 216 and the valve head 217 spaced from its seat 205, the piston 212 being in its left hand position. Thus, at this time the spring 214 will be at its minimum tension.

As the fluid under pressure flows from port 95, it will pass through valve 96 and line 97 to charge the accumulator 106 and also pass into chamber 104 of main valve 12'. In addition, such fluid will flow into port 202 of the pilot valve 203, thence into chamber 220 thereof and through open seat 205, bore 206 and passageway 207 into annular groove 208 and line 211 into port 91 of the unloader valve 12' to charge the chamber 87 thereof.

Since the chambers 87 and 104 of the unloader valve will be under the same pressure, the spring 89 will maintain the piston 83 of the unloader valve 12' in position such that ports 109 and 95 are in communication.

As the pressure builds up in chamber 220, it will cause the piston 212 to move to the right until it strikes abutment 221. As a result, the tension of spring 214 will be increased.

When the pressure in the system reaches, say, 3,000 p.s.i., the accumulator 106, the chambers 104, 87 and the chamber 220 will all be at such pressure. In addition, such pressure will react against the seated valve head 215.

At this time there will be sufficient pressure against the valve head 215 to cause it to move away from its seat against the force exerted by the extended spring 214 and the valve head 217 will seat.

As a result of the opening of valve 215, the pressure in chamber 87 will immediately drop since this chamber will now be connected to the reservoir 94 through line 211, port 209, annular groove 208, passageway 207 and bore 206.

Since, at this time the pressure in chamber 104 is still at the accumulator pressure of 3,000 p.s.i., the piston 83 will immediately move to the right against the tension of the coil spring 89 thereby closing pressure port 95 so that no further fluid under pressure will come from the pump.

As the accumulator pressure drops, due to the use of the system to which it is connected, the pressure in chamber 220 connected to the accumulator through lines 201 and 97 will also drop. Spring 214 which is at its maximum tension thus moving piston 212 to the left and decreasing the force exerted by the spring. When the piston 212 moves completely to the left, restrained by abutment 210 and when the pressure in chamber 220 drops to say, 2,800 p.s.i. due to the drop in pressure in the accumulator, there will be sufficient spring force available at this time to cause valve head 217 to move off its seat 205 against which it is retained by the pressure in chamber 220.

As a result, when valve head 217 is moved away from its seat, the valve head 215 will seat.

Thereupon, fluid under pressure will again be applied from the accumulator to the chamber 220 and then to the chamber 87 of the main valve 12'. Since the pressure in chamber 104 and 87 now is the accumulator pressure and hence the pressure on both sides of the piston 83 is equalized, at this time the spring 89 will again move the piston 83 to the left to open port 95 and fluid under pressure from the pump can again flow into the system to recharge the accumulator.

In the embodiment shown in FIG. 4, a main unloader valve, similar to that shown in FIG. 2 is employed.

When the system is initially turned on the spring 177 reacting against piston 174 of unloader valve 122' will urge such piston against the stop 176 so that pressure ports 181 and 182 are in communication through annular groove 175.

With respect to the pilot valve 252, the spring 253 thereof will retain valve head 254 against its seat 255 and also move the piston 256 against stop 257.

At this time, also, the valve head 258 will be spaced from its seat 259 and hence the chamber 179 of unloader valve 122, the chamber 261 of the valve 252 and the chamber 262 of the piston 256 will all be connected to the reservoir 188 through the open valve seat 259, passageway 263, annular groove 264, port 265 and line 266.

Thus, the pressure in chamber 179 of valve 122' will be relieved and hence by reason of the spring 177, the piston 174 thereof will remain in the position to connect the ports 181, 182.

As the pressure builds up in chamber 267 of valve 252, due to the pumping action applied to such chamber through port 268, the piston 256 will be moved to the right against abutment 269, thereby increasing the tension on spring 253 so that the valve head 254 is retained with greater force against the seat 255.

When the pressure builds up to say 3,000 p.s.i., the valve head 254 will be moved off its seat against the tension of spring 253 and the valve head 258 will seat.

Opening of valve 254 will cause the pressure in the system, which is now at 3,000 p.s.i., to be applied through passageway 271 into chamber 261 and through line 272 and port 192 into chamber 179 of the unloader valve 122'.

As a result of the pressure of say 3,000 p.s.i. in chamber 179 of the unloader valve, it will be quickly moved to the left against the tension of coil spring 177 to close the port 182 so that no further fluid under pressure will be applied to the system from the pump connected to port 181.

At this time the accumulator 185 is still connected to the port 268. As the fluid pressure in the accumulator drops, due to the use by the system, the pressure in chamber 267 of valve 252 will drop and hence the piston 256 will move to the left reducing the tension on spring 253. However, the force exerted by the pressure in chamber 267 will still be sufficient due to the reduction in the force exerted by spring 253 still to retain the valve head 258 against its seat 259. When the piston 256 reaches abutment 257, with further reduction in pressure, say to a value of 2,800 p.s.i., there will be sufficient spring pressure now to overcome the force exerted against the valve head 258 so that the latter will move away from its seat 259 and the valve head 254 will close its seat 255.

As a result of the opening of valve seat 259, the chambers 179 of valve 122' and 261 of valve 252 will both be connected to the reservoir 188. Consequently, since the pressure in chamber 179 drops immediately, the spring 177 of valve 122' will quickly move the piston 174 thereof to the right to again provide communication between ports 181, 182 to restore the system to its original operating condition.

In the embodiment shown in FIG. 5, the unloader valve and the pilot valve are both combined in one casing 300.

In the original position of this system, before pressure is applied, the coil spring 301 will retain the main valve body 302 against its seat 303.

The coil spring 304 reacting through the rod 305 will retain the valve head 306 against its seat 307 and the valve head 308 slightly spaced from its seat 309.

The inlet port 312 is connected to a suitable pump adapted to supply fluid under pressure and also through passageway 313 to the bore 314 of the unit to react against the annular surface 315 of the valve 302. In addition, passageway 313 is connected by passageway 316 to a passageway 317 which has a port 318 connected by line 319 to an accumulator 321 and also to a line 322 connected to the system to be operated.

The end of the passageway 316 defines a valve seat 323 against which is urged a ball valve 324 by a spring 325.

The unit also has a port 326 connected to return and in communication with a chamber 327 on the side of the valve 302 adjacent its surface 315.

When the system is turned on as the pressure builds up, the fluid under pressure will pass through port 312, passageway 313, passageway 316, past the ball valve 324 into passageway 317 and through port 318 and line 319 to the accumulator 321 and to the line 322 connected to the system being operated.

In addition, such fluid under pressure will go through passageway 328 into annular groove 329 in valve 302 and thence through open valve seat 309 and passageway 333 into chamber 334 which defines a pressure chamber, the pressure in such chamber 334 reacting against the end 335 of the main valve 302.

Due to the force exerted by the pressure in chamber 334 and the force of spring 301, the main valve 302 will be retained against its seat 303.

When the pressure in the system builds up to say 3,000 p.s.i., such pressure will be applied through passageway 313, 316, 328, annular groove 329, passageway 331 into chamber 332 and thence through bore 335 to react against the seated valve 306.

The coil spring 304 is set by the screw plug 336 so that it will require a pressure of say 3,000 p.s.i. against the valve head 306 to move the latter off its seat 307.

When such pressure of 3,000 p.s.i., for example, is obtained, the valve head 306 will move off its seat 307 and valve 308 will close.

Thus, communication will be provided from pressure chamber 334, through passageway 333 and bore 335, open valve seat 307 to chamber 327 which goes to return through port 326 and the pressure in chamber 324 will immediately drop. As a result, the force of the pressure from the pump applied to port 312 reacting against the surface 315 of valve 302 will immediately move said valve off its seat 303 so that the pump will now discharge to return through port 326 and no further pressure will be applied to the accumulator 318, the valve 324 now being seated to prevent discharge of such accumulator.

As a result, no further build up of pressure will be possible in the system.

When the main valve 302 moves away from its seat 303, it will permit the coil spring 304 to extend so that the latter becomes weaker, i.e., the force exerted by such spring will be reduced.

With the use of the system to which the accumulator is connected, the pressure in such system will drop since the pump is bypassed to return. When such pressure drops to say 2,800 p.s.i., it will also be applied through port 318, passageways 317, 328, annular groove 329, passageway 331, chamber 332 to the valve head 303 which is seated. At such pressure of 2,800 p.s.i., the force exerted by spring 304 will be sufficient to overcome the same and hence the rod 305 will be moved to the right, seating the valve 306 and unseating the valve 308.

As a result of the closure of valve 306, there will be no communication afforded from pressure chamber 334 to return and hence the pressure in such chamber will again build up, i.e., to the accumulator pressure. Since this pressure is greater than that prevailing against the surface 315 of the main valve 302, the latter will quickly be moved against its seat 303 and the system is back to its normal operating position.

It is apparent that by adjustment of the spring 304 by turning of the knob 306, the maximum operating pressure can be determined and by adjustment of the plug 340 to change the stroke of the main valve, the differential between the maximum and minimum can be determined because the amount of movement of the main valve head determines the extension of the coil spring which determines the minimum return pressure.

With the embodiments above described, a system can be dependably maintained between two operating pressures which can readily be pre-set and hence there is assurance that the equipment being operated by the system will have the proper pressures appied thereto.

As many changes could be made in the above construction, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A valve system for controlling the pressure in a hydraulic system comprising a main unloader valve having a pressure inlet port, a pressure outlet port and a discharge port, a slidable member, a pilot valve operatively controlling said slidable member, resilient means reacting against said pilot valve normally to close the latter, means when said pilot valve is closed to retain said slidable member in position connecting said inlet and outlet ports and closing said discharge port, pressure means when the pressure in said system has risen to a predetermined amount, to increase the force of said resilient means and open said pilot valve against the force exerted by said resilient means, said pressure means when said pilot valve is open, reducing the force exerted by said resilient means against said pilot valve and effecting movement of the slidable member to cut off connection between said inlet and outlet ports and open said discharge port, and when the pressure in the system has fallen to a predetermined amount to close said pilot valve against the reduced force exerted by said resilient means and means to adjust the force exerted by said resilient means.

2. A valve system comprising a main unloader valve and a pilot valve, said main valve having a housing with a piston slidable therein, said main valve having a pressure inlet port, a pressure outlet port and a discharge port, resilient means normally urging said piston in direction to connect said inlet and outlet ports and to close said discharge port, means to adjust the force exerted by said resilient means, a pressure chamber on each side of said piston of said main valve, said pilot valve comprising a housing having a piston slidable therein and movable between two extreme positions, said piston having a chamber therein and an axial bore leading into said chamber, each of the ends of said bore defining a valve seat, a pair of valves controlling the respective ends of said bore, means providing communication between said piston chamber and said outlet port of said unloader valve in all positions of the piston of said pilot valve, resilient means in said pilot valve housing reacting against one of said valves and one side of said piston to close one of said valves and to open the other and providing communication between said piston chamber and said bore, a chamber on the other side of said piston of said pilot valve, means providing communication between said bore and said last chamber and means providing communication between said last chamber and the chamber of said unloader valve in which the resilient means thereof is positioned.

3. A valve system adapted to be connected between a source of fluid under pressure and a pressure accumulator to which a pressure system is connected, said valve system comprising a pilot valve, and an unloader valve, the latter having a pressure inlet port, a pressure outlet port and a discharge port, a slidable member in said unloader valve movable between two extreme positions adapted to connect said pressure inlet port with either said outlet or discharge port, a pressure chamber in said unloader valve in communication with one end of said slidable member, means connecting said accumulator and said outlet port to said unloader valve for reaction of the fluid pressure therefrom against the other end of said slidable member, said pilot valve having a pressure chamber and a discharge chamber, the latter having an inlet and an outlet, a valve member controlling said inlet, resilient means in said pilot valve reacting against said valve member normally to retain the latter in closed position, a slidable member in said pilot valve between the pressure chamber and the discharge chamber therein, against which the fluid pressure in said pressure chamber reacts to increase the force exerted by said resilient means against said valve member and movable between two extreme positions, a fluid passageway between the pressure chamber of said pilot and unloader valves, a second fluid passageway in said pilot valve having one end in communication with the pressure chamber thereof and its other end defining the inlet to said discharge chamber, said other end defining a seat for said valve member, a third fluid passageway providing communication between said pressure outlet port and said second fluid passageway and normally open valve means controlling said flow from said third fluid passageway to said second fluid passageway, a valve seat for said valve means being provided between said second and said third fluid passageways, said valve member and said valve means being alternately in closed and open position, whereby when the pressure in said second fluid passageway has reached a predetermined amount, said valve member will open said inlet, to cause the pressure in the pressure chambers of said pilot and unloader valves to drop to reduce the force exerted by said resilient means, the pressure in said accumulator moving the slidable member of said unloader valve to cut off communication between said pressure inlet and outlet and when the pressure has fallen to a predetermined value, said valve member will close and said valve means will open to again connect the source of fluid under pressure to said accumulator.

4. The combination set forth in claim 3 in which said second fluid passageway comprises an axial bore in said slidable member of said pilot valve, and a passageway connecting said axial bore to said pressure chamber, said valve member and said valve means each has a valve head and a valve stem, the ends of said stems abutting and of length such that when one valve head is seated the other is unseated.

References Cited by the Examiner
UNITED STATES PATENTS

| | | | |
|---|---|---|---|
| 2,420,394 | 5/1947 | Gilman | 137—108 |
| 2,447,820 | 8/1948 | Schultz | 137—108 |
| 2,474,122 | 6/1949 | Schneck | 137—108 |

MARTIN P. SCHWADRON, *Acting Primary Examiner.*

M. CARY NELSON, *Examiner.*